(12) United States Patent
Wurst et al.

(10) Patent No.: US 10,935,415 B2
(45) Date of Patent: Mar. 2, 2021

(54) CAPSULE WEIGHING DEVICE AND CAPSULE FILLING DEVICE HAVING SUCH A CAPSULE WEIGHING DEVICE

(71) Applicant: Harro Hoefliger Verpackungsmaschinen GmbH, Allmersbach im Tal (DE)

(72) Inventors: Reiner Wurst, Allmersbach im Tal (DE); Michael Wildenhain, Allmersbach im Tal (DE); Thomas Puppich, Allmersbach im Tal (DE); Bernhard Handel, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 214 days.

(21) Appl. No.: 16/200,398

(22) Filed: Nov. 26, 2018

(65) Prior Publication Data
US 2019/0162582 A1 May 30, 2019

(30) Foreign Application Priority Data
Nov. 24, 2017 (EP) .................................... 17203515

(51) Int. Cl.
*G01G 17/00* (2006.01)
*G01G 21/28* (2006.01)
(Continued)

(52) U.S. Cl.
CPC .............. *G01G 17/00* (2013.01); *A61J 3/074* (2013.01); *B65B 1/04* (2013.01); *B65B 7/28* (2013.01);
(Continued)

(58) Field of Classification Search
CPC ....... G01G 17/00; G01G 21/286; A61J 3/074; A61J 2200/74; B65B 1/04; B65B 7/28
See application file for complete search history.

(56) References Cited

U.S. PATENT DOCUMENTS

| | | | | |
|---|---|---|---|---|
| 4,223,751 A | * | 9/1980 | Ayers | ........................ B07C 5/16 177/210 C |
| 4,821,821 A | * | 4/1989 | Kelley | ................. G01G 21/286 177/181 |

(Continued)

FOREIGN PATENT DOCUMENTS

| | | |
|---|---|---|
| DE | 10 2014 110 906 A1 | 2/2015 |
| WO | 9620390 A1 | 7/1996 |

*Primary Examiner* — Randy W Gibson
(74) *Attorney, Agent, or Firm* — Walter Ottesen, P.A.

(57) ABSTRACT

The disclosure relates to a capsule weighing device and to a capsule filling device having at least one such capsule weighing device. The capsule weighing device includes a measuring unit and a capsule measuring receiver for holding a capsule. The capsule measuring receiver is positioned at the side of the measuring unit with reference to the weight force direction and includes a capsule measuring channel which is continuous in the weight force direction and has a releasable locking mechanism for the capsule. The capsule filling device may include a receiving station for empty capsules and ejection station for filled capsules, wherein a first capsule weighing device is arranged on the input side of the receiving station for tare weighing, and wherein a second capsule weighing device is arranged on the output side of the ejection station for gross weighing.

12 Claims, 2 Drawing Sheets

(51) Int. Cl.
   *A61J 3/07*     (2006.01)
   *B65B 1/04*     (2006.01)
   *B65B 7/28*     (2006.01)

(52) U.S. Cl.
   CPC ......... *G01G 21/286* (2013.01); *A61J 2200/74* (2013.01)

(56) References Cited

U.S. PATENT DOCUMENTS

| | | | | |
|---|---|---|---|---|
| 6,114,636 | A * | 9/2000 | Cane' | G01G 17/00 177/145 |
| 6,162,998 | A * | 12/2000 | Wurst | G01G 17/00 177/145 |
| 6,877,611 | B2 * | 4/2005 | Yamamoto | A61J 3/074 209/646 |
| 9,523,605 | B2 * | 12/2016 | Gamberini | G01G 23/3707 |
| 2012/0207272 | A1 * | 8/2012 | Runft | G01N 23/04 378/57 |
| 2013/0206484 | A1 * | 8/2013 | Consoli | G01G 13/026 177/1 |
| 2015/0034397 | A1 * | 2/2015 | Gamberini | A61J 3/074 177/1 |
| 2017/0216147 | A1 * | 8/2017 | Franck | B65B 69/00 |

* cited by examiner

CAPSULE WEIGHING DEVICE AND CAPSULE FILLING DEVICE HAVING SUCH A CAPSULE WEIGHING DEVICE

CROSS REFERENCE TO RELATED APPLICATION

This application claims priority of European patent application no. 17203515.6, filed Nov. 24, 2017, the entire content of which is incorporated herein by reference.

FIELD OF THE INVENTION

The invention relates to a capsule weighing device for weighing capsules and to a capsule filling device having at least one such capsule weighing device.

BACKGROUND OF THE INVENTION

Capsules are used for the administration of metered quantities of a pulverent, granular or liquid preparation first and foremost in the pharmaceutical field but also in the field of nutritional supplements. The capsules are made of hard gelatin or the like and dissolve once swallowed, as a result of which the contents thereof are released.

In the case of so-called two-piece capsules, empty capsules, which are positioned standing upright in capsule holders, are first of all fed to synchronized capsule filling machines and are then opened. In one or multiple metering stations, the upwardly open capsule lower parts are filled with metered quantities of the provided preparation. The previously removed capsule upper parts are fitted onto the filled capsule lower parts in a closing station. The ready filled capsules, which are created in this manner, are finally removed from their capsule holders in an eject station and are then supplied for further processing, in particular for packaging.

Certain quality requirements can make it necessary to weigh all the capsules at least on a random basis or even within the framework of a one-hundred percent in process check in order to check and ensure regular filling.

Capsule weighing devices, where the capsules to be weighed are placed on an upper capsule receiver in the weight force direction and are then weighed, are used for this purpose in the prior art. The capsule has to undergo a complicated movement sequence to do this. It is moved from its standing normal position into a horizontal position, advanced to the side and is deposited on the capsule receiver in a vertical movement. Once the unit of capsule receiver and capsule resting thereon has come to rest, they are weighed. The capsules are then conveyed further in a combined vertical and horizontal movement, the lifting signifying a change in direction compared to the previously effected depositing. Finally, it can then be necessary to rotate the capsule once again from its horizontal weighing position into an upright position.

The complicated movement sequence which is linked to a change in direction is not only mechanically demanding but also requires the corresponding time. The time requirement provides a restricting factor to the cycle time of the capsule filling machine, in particular when a one-hundred percent check on all processed capsules is to take place.

So-called tare-gross weighing operations of capsules are also disclosed in the prior art in order to be able to carry out particularly precise measurements in particular in the case of proportionately small fill weights. In this connection, the empty capsules are weighed first of all and the tare weight for each capsule is determined therefrom. The filled capsules are then subsequently weighed to determine the gross weight. The net weight of the capsule filling that is actually present is then obtained from the difference between the two values. Fluctuations in the empty capsule weight can be eliminated in particular in this way. The difficulties described above with regard to device and time expenditure certainly occur particularly significantly in this connection also.

SUMMARY OF THE INVENTION

It is an object of the invention to provide a capsule weighing device with which it is possible to weigh the capsule in a quicker and nevertheless precise manner.

This object can, for example, be achieved by a capsule weighing device for weighing capsules. The capsule weighing device includes: a measuring unit; a capsule measuring receiver configured to hold a capsule during weighing in a weight force direction; the capsule measuring receiver being positioned laterally of the measuring unit relative to the weight force direction; and, a capsule measuring channel which is continuous in the weight force direction and has a releasable locking mechanism for the capsule.

It is a further object of the invention to provide a capsule filling device with improved checking possibilities for the capsules handled therein.

This object can, for example, be achieved by a capsule filling device having: at least one capsule weighing device having a measuring unit and a capsule measuring receiver configured to hold a capsule during weighing in a weight force direction; the capsule measuring receiver being positioned laterally of the measuring unit relative to the weight force direction; and, the at least one capsule weighing device further having a capsule measuring channel which is continuous in the weight force direction and has a releasable locking mechanism for the capsule.

A capsule weighing device and a capsule filling device having such a capsule weighing device are provided according to the disclosure, wherein the capsule measuring receiver is positioned at the side of the measuring unit with reference to the weight force direction and includes a capsule measuring channel which is continuous in the weight force direction and has a releasable locking mechanism for the capsule. The physical configuration allows, in an associated method according to the disclosure, individual capsules to be inserted from above into the capsule measuring channel of the capsule measuring receiver and to be removed again from below. The releasable locking mechanism holds the capsule for the duration of the weighing operation and then releases it downward. As a result of the arrangement of the capsule measuring receiver to the side of the measuring unit, the measuring unit is not in the way when the capsule is guided through vertically.

As the capsule measuring channel is continuous in the weight force direction, the acting weight force is sufficient to convey the capsule without a drive mechanism being necessary for this purpose. It can be sufficient for the individual capsules to move exclusively downward in the region of the capsule weighing device. No change in direction occurs here at least with reference to the vertical direction. However, within the framework of the invention, moving the just-weighed capsule back upward out of the capsule measuring receiver can also be considered.

In a further embodiment, the capsule measuring channel is configured for receiving an upright capsule. In particular when the capsule filling device includes a capsule guide channel in any case, and when the capsule measuring channel forms a part portion of the capsule guide channel which is present in any case, it is not necessary to rotate the capsule from an upright position into a horizontal position and/or vice versa either. As a result, highly-precise weight measurements can be performed on the capsules with minimum device expenditure at a considerably shortened cycle time.

Guide rails, guide wires or the like can be used to form the capsule measuring channel. The capsule measuring channel can be realized as a tube which is closed in the circumferential direction. As a result, the capsule is protected against external mechanical influences during the weighing operation.

In a further embodiment, the capsule weighing device includes at least one draft shield for demand-related closing and opening of the input side and/or the output side of the capsule measuring channel. Falsification of the measuring results as a result of a draft can be ruled out or at least reduced in particular in connection with the closed tube form. In a further embodiment, the capsule measuring channel is electrically shielded. The use of electrically conducting material is considered here. It can be expedient to this end, in particular, to produce the capsule measuring channel from a metallic material, for example in the form of a net, a grid, a closed tube or the like. A Faraday cage is created in all cases. Potential measured value falsifications as a result of electrostatic forces are largely eliminated.

The locking mechanism can include a locking bar, which is mounted on the capsule measuring channel, and a drive for the locking bar, which is separate from the capsule measuring receiver. In such a case, the drive can act on the locking bar in a contactless manner, for example via a magnetic field or the like, for the activation thereof but does not appear in the actual weighing operation. The drive and the control and energy power lines thereof cannot falsify the measuring result. The locking bar itself can be kept small and simple such that the weight of the capsule measuring receiver is reduced to a minimum. This contributes to the shortening of the cycle times during weighing and also to measuring precision.

Positioning a capsule weighing device only on the output side of the capsule filling device can suffice in order, thereby, to perform a rapid-cycle weighing operation on the filled capsules. The capsule filling device can include a receive or receiving station for empty capsules and an eject or ejection station for filled capsules, wherein a first capsule weighing device is arranged on the input side of the receive station for tare weighing, and wherein a second capsule weighing device is arranged on the output side of the eject station for net weighing. As a result, even in the case of very short cycle times, it is possible to perform a tare-gross weighing operation with precise determination of the net contents of individual or all capsules, which the weight-dependent sorting of capsules found to be good or bad within the framework of a one-hundred percent in process check allows.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
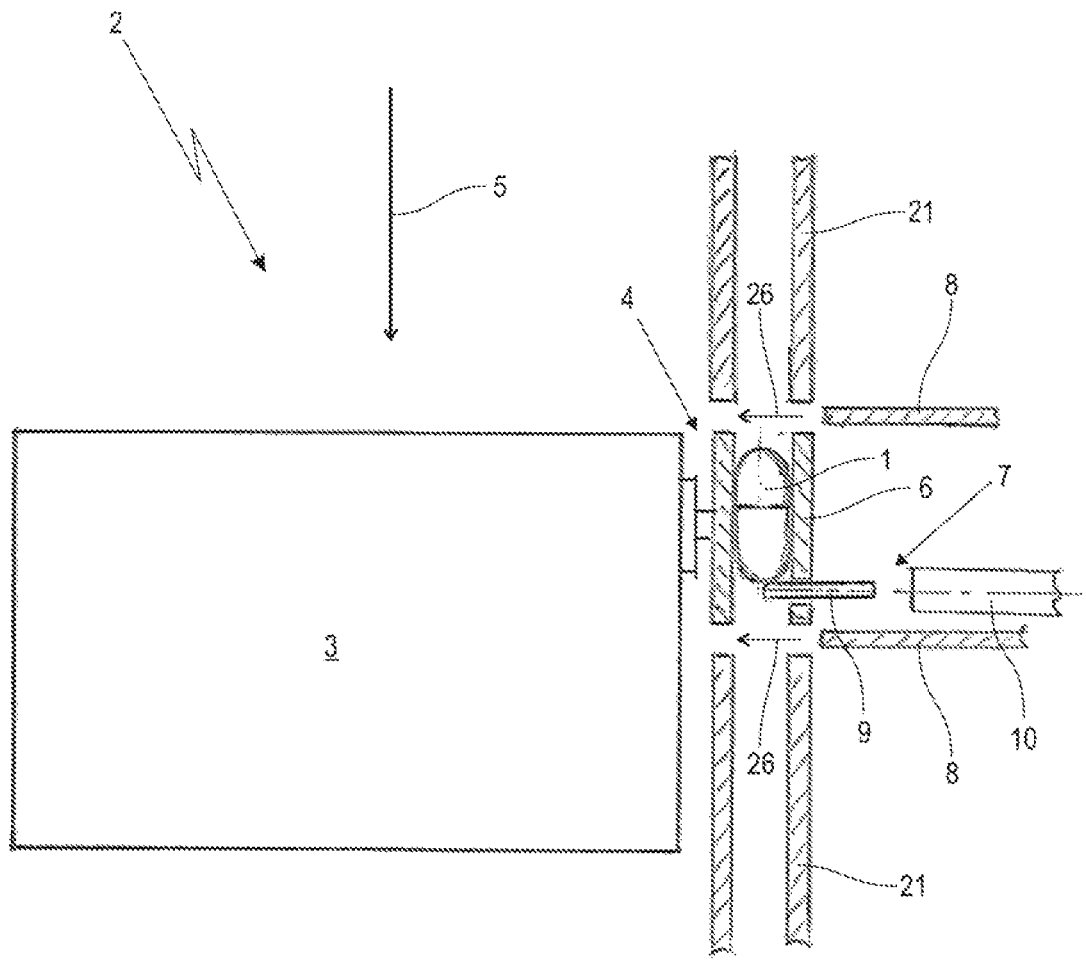
FIG. 1 shows a schematic sectional representation of a capsule weighing device having a vertically orientated capsule receiver and having an associated locking mechanism; and, FIG. 2 shows a schematic top view of a capsule filling device having a total of two capsule weighing devices according to FIG. 1 for a tare/gross weighing operation.

FIG. 1 shows a schematic sectional representation of a capsule weighing device 2 configured according to an embodiment of the invention for the weighing of individual capsules 1. The capsule weighing device 2 includes a measuring unit 3, which is only indicated schematically, with an integrated measuring sensor and with a capsule measuring receiver 4 in which the respective capsule 1 is held during the weighing operation. The capsule weighing device 2 is shown in its usual operating position relative to the weight force direction 5 which acts downwardly and is specified by an arrow, the capsule measuring receiver 4 being consequently situated to the side next to the measuring unit 3 with reference thereto.

A capsule measuring channel 6, which extends continuously from above to below in the weight force direction 5 and receives or guides through a capsule 1, is formed in the capsule measuring receiver 4. In the embodiment shown, the capsule measuring channel 6 extends parallel to the weight force direction 5, that is, vertically. It can, however, also be inclined with a lateral direction component at an angle to the weight force direction 5. In an embodiment, a progression in the weight force direction 5 should only be provided insofar as the respective capsule 1 is able to pass through automatically from above to below on account of the weight force which acts on it. Where applicable, however, supporting the passage of the capsule, for example with compressed air, can also be advantageous in order to overcome a deadlock or the like. As an alternative to this or in addition to it, however, other mechanisms can also be considered for movement of the capsules 1, movement directions counter to the weight force direction 5 also being possible within the framework of the invention.

In addition, it can also be seen that the capsule measuring channel 6 is configured for receiving an upright capsule 1. To this end, it includes an, in particular, circular cross section that is matched to the diameter of the capsule 1. Other cross sectional forms can also be expedient. In all cases, the cross section of the capsule measuring channel 6 is dimensioned in such a manner that the capsule 1 located therein is held in its shown upright position.

The capsule measuring receiver 4 additionally has a locking mechanism 7 which includes a locking bar 9 mounted on the capsule measuring channel 6 and a drive 10 for the locking bar 9 which is separate from the capsule measuring receiver 4. The locking bar 9 can be switched back and forth between a locking position, which locks the passage of the capsule measuring channel 6, and an unlocking position, which releases the passage of the capsule measuring channel 6, via the drive 10 in particular in a contactless manner and, for example, as a result of magnetic influence. No mechanical interaction exists between the locking bar 9 and its drive 10 in terms of time outside the switching operations such that the drive 10 then has no effect on the weighing operation of the capsule measuring receiver 4 with the capsule 1.

The capsule measuring channel 6 is realized in a preferred manner as a tube which is closed at least largely in the circumferential direction. This includes the possibility of the presence of a longitudinal slot, through which the capsule 1 could be moved upward or downward via an entrainer (not shown). In the shown embodiment, however, it is a tube which is entirely closed in the circumferential direction. Furthermore, the capsule weighing device 2 also has at least one draft shield 8 for demand-related closing and opening of the input side and/or the output side of the capsule measuring channel 6. In the embodiment shown, one draft shield 8 each is arranged at the upper input side and at the lower output side of the capsule measuring channel 6. Each draft shield 8 is shown in the open position, but can, where required, be moved into a closed position corresponding to an arrow 26 and also back out of it again. As soon as the capsule 1 has reached the weighing position thereof corresponding to the representation according to FIG. 1, an almost hermetically sealed space can consequently be generated without the falsifying effect of an air draft or the like, in which space the capsule is at rest and is weighed.

In an associated method, the upper draft shield 8 according to FIG. 1 is initially open, whilst the locking bar 9 is initially situated in the closed locking position shown. The capsule to be weighed is then introduced from above in an upright position into the capsule measuring channel 6 of the capsule measuring receiver 4, where it falls onto the closed locking bar 9 as a result of its weight force and remains there. The upper and also the lower draft shield 8 can be closed then in the direction of the arrows 26 without, however, moving into direct contact with the capsule measuring receiver 4. As an alternative to this, however, it can also be expedient to mount the respective draft shield 8 on the capsule measuring receiver 4 and to actuate it analogously to the locking bar 9 by way of an external drive. At all events, the weighing is now performed where the weight of the introduced capsule 1 is determined in the measuring unit 3 and is held ready for subsequent evaluation.

After successful weighing, at least the lower draft shield 8 is opened, and the locking bar 9 is unlocked via the drive 10 thereof. The weighed capsule 1 then falls downward out of the capsule measuring receiver 4 and can be supplied for further processing. Overall, in this case, the capsule 1 runs through the capsule measuring receiver 4 from above to below without experiencing any direction reversal in so doing and without changing its upright position in so doing. Where the cross section of the capsule measuring channel is correspondingly adapted, the described method can also be carried out consistently for horizontal capsules without time-consuming rotation being necessary.

Furthermore, the capsule measuring channel 6 is electrically shielded, which is why it is realized in the embodiment shown in an electrically conducting manner as a tube produced from a metal material. An electrically conducting plastics material, an embedded wire grid or the like can also be used. The same can also apply analogously to the upper and/or the lower draft shield 8. At all events, as a result the capsule measuring channel 6 acts as a Faraday cage for shielding against external electromechanical or electrostatic influences.

Figure 2:
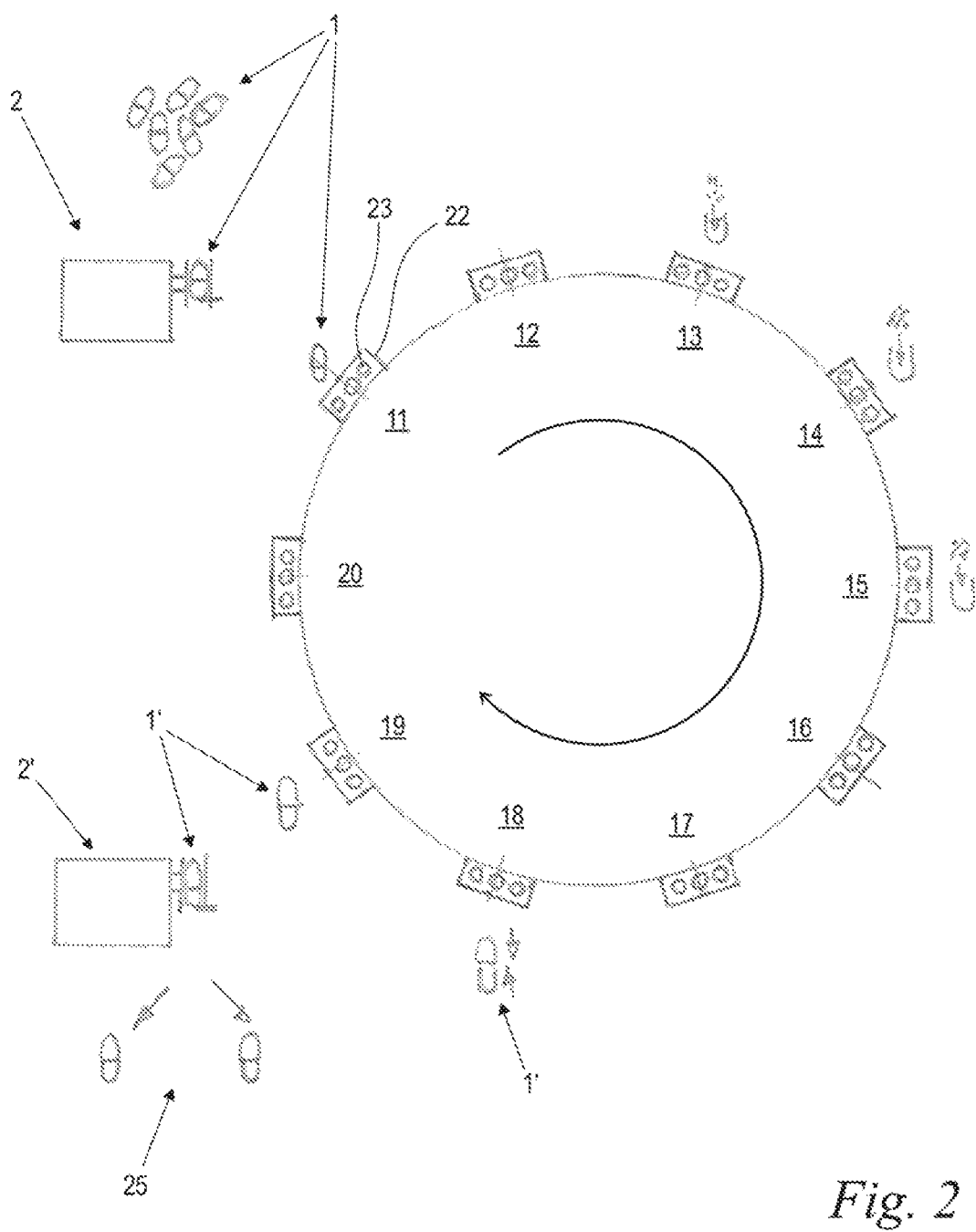

FIG. 2 shows a schematic top view of a capsule filling device with multiple, here as an example ten processing stations 11 to 20 which are used in a synchronized manner. Here these are a receive station 11, an opening station 12, multiple metering stations 13, 14, 15, a closing station 18 and an eject station 19. To run through the various processing stations 11 to 20, the capsule filling device includes a turntable with schematically indicated capsule holders 22, at least one, here multiple capsule receivers 23 being introduced for each capsule 1 in each capsule holder 22. Via the turntable and the capsule holders 22 mounted thereon, the capsules 1 run through the various processing stations 11 to 20 in a sequential and synchronized manner in a through direction 24.

The capsule filling device additionally includes a first capsule weighing device 2 and a second capsule weighing device 2', both capsule weighing devices 2, 2' corresponding identically to the configuration according to FIG. 1. As is shown only in FIG. 1 to provide a better overview, one capsule guide channel 21 each is part of the capsule filling device for each capsule weighing device 2, 2'. The capsule measuring receiver 4, in this case, is configured in such a manner that the integrated capsule measuring channel 6 thereof forms a part portion of the capsule guide channel 21 in each case. The first capsule weighing device 2 is situated on the input side of the receive station 11 for weighing supplied empty capsules 1, whilst the second capsule weighing device 2' is positioned on the output side of the eject station 19 for weighing full capsules 1'. The capsules 1, 1' in the present case are two-part capsules with a capsule lower part and a capsule upper part which is fitted thereon. However, it is also possible to weigh other sorts of capsules 1, 1'.

In the method sequence, empty capsules 1 are supplied to the first capsule weighing device 2 and are weighed there in the above described manner. As empty capsules 1 are weighed here, this is a so-called tare weighing operation. The weighed empty capsules 1 are guided downward through the capsule guide channel 21 (FIG. 1) to the receive station 11. There they are inserted in the upright position into the capsule receiver 23 of the capsule holders 22. A capsule holder 22 which is charged in this way with empty capsules 1 is then moved to the next station, namely the opening station 12 where the empty capsules 1 are opened. In other words, the capsule upper parts are removed from the capsule lower parts there. In the following metering stations 13, 14, 15, metered quantities of a fill material are filled into the upwardly open capsule lower parts. The capsule upper parts, which were previously removed, are fitted onto their associated, now filled, capsule lower parts again at the closing station 18 such that filled capsules 1' are created.

The filled capsules 1' are ejected out of the capsule receiver 23 of their capsule holders 22 at the following eject station 19 and are then introduced from above, analogously to the representation according to FIG. 1, into the second capsule weighing device 2' via the associated capsule guide channel 21 and are weighed there. As filled capsules 1' are weighed here, this is a so-called gross weighing operation. By finding the difference between the results from the gross weighing operation and the tare weighing operation, the weight of the contents actually located in the filled capsule 1' is determined as the actual value. By comparing this to the required value or to an admissible required value, the decision is automatically made as to whether it is a good or a bad capsule 1'. In a downstream capsule sorting operation 25, which also belongs to the capsule filling device, the capsules 1' which have been recognized as good are finally separated from the bad capsules which are not according to specification.

It is understood that the foregoing description is that of the preferred embodiments of the invention and that various changes and modifications may be made thereto without departing from the spirit and scope of the invention as defined in the appended claims.

What is claimed is:

1. A capsule weighing device for weighing capsules, the capsule weighing device comprising:
a measuring unit;

a capsule measuring receiver configured to hold a capsule during weighing in a weight force direction;

said capsule measuring receiver being positioned laterally of the measuring unit relative to the weight force direction;

a capsule measuring channel which is continuous in the weight force direction and has a releasable locking mechanism for the capsule;

said capsule measuring channel having an input end and an output end; and, at least one draft shield for demand-dependent closing and opening of at least one of said input end and said output end of said capsule measuring channel.

2. The capsule weighing device of claim 1, wherein:
said capsule measuring channel is a tube defining a circumferential direction; and,
said tube is closed in the circumferential direction.

3. The capsule weighing device of claim 1, wherein said capsule measuring channel is electrically shielded.

4. A capsule weighing device for weighing capsules, the capsule weighing device comprising:
a measuring unit;
a capsule measuring receiver configured to hold a capsule during weighing in a weight force direction;
said capsule measuring receiver being positioned laterally of the measuring unit relative to the weight force direction;
a capsule measuring channel which is continuous in the weight force direction and has a releasable locking mechanism for the capsule;
said locking mechanism including a locking bar and a drive for said locking bar;
said locking bar being mounted on said capsule measuring channel; and,
said drive for said locking bar being separate from said capsule measuring receiver.

5. The capsule weighing device of claim 1, wherein said capsule measuring channel is configured to receive an upright capsule.

6. A capsule filling device comprising:
at least one capsule weighing device having a measuring unit and a capsule measuring receiver configured to hold a capsule during weighing in a weight force direction;
said capsule measuring receiver being positioned laterally of the measuring unit relative to the weight force direction;
said at least one capsule weighing device further having a capsule measuring channel which is continuous in the weight force direction and has a releasable locking mechanism for the capsule;
said capsule measuring channel having an input end and an output end; and,
at least one draft shield for demand-dependent closing and opening of at least one of said input end and said output end of said capsule measuring channel.

7. The capsule filling device of claim 6 further comprising:
a capsule guide channel; and,
said capsule measuring channel forming a portion of said capsule guide channel.

8. The capsule filling device of claim 6 further comprising:
a receiving station for empty capsules;
an ejection station for filled capsules;
said receiving station having an input side;
said ejection station having an output side;
the capsule filling device including a first capsule weighing device arranged on said input side of said receiving station for tare weighing; and,
the capsule filling device further including a second capsule weighing device arranged on said output side of said ejection station for gross weighing.

9. The capsule filling device of claim 6, wherein:
said capsule measuring channel is a tube defining a circumferential direction; and,
said tube is closed in the circumferential direction.

10. The capsule filling device of claim 6, wherein said capsule measuring channel is electrically shielded.

11. A capsule filling device comprising:
at least one capsule weighing device having a measuring unit and a capsule measuring receiver configured to hold a capsule during weighing in a weight force direction;
said capsule measuring receiver being positioned laterally of the measuring unit relative to the weight force direction;
said at least one capsule weighing device further having a capsule measuring channel which is continuous in the weight force direction and has a releasable locking mechanism for the capsule;
said locking mechanism including a locking bar and a drive for said locking bar;
said locking bar being mounted on said capsule measuring channel; and,
said drive for said locking bar being separate from said capsule measuring receiver.

12. The capsule filling device of claim 6, wherein said capsule measuring channel is configured to receive an upright capsule.

* * * * *